Patented Nov. 20, 1934

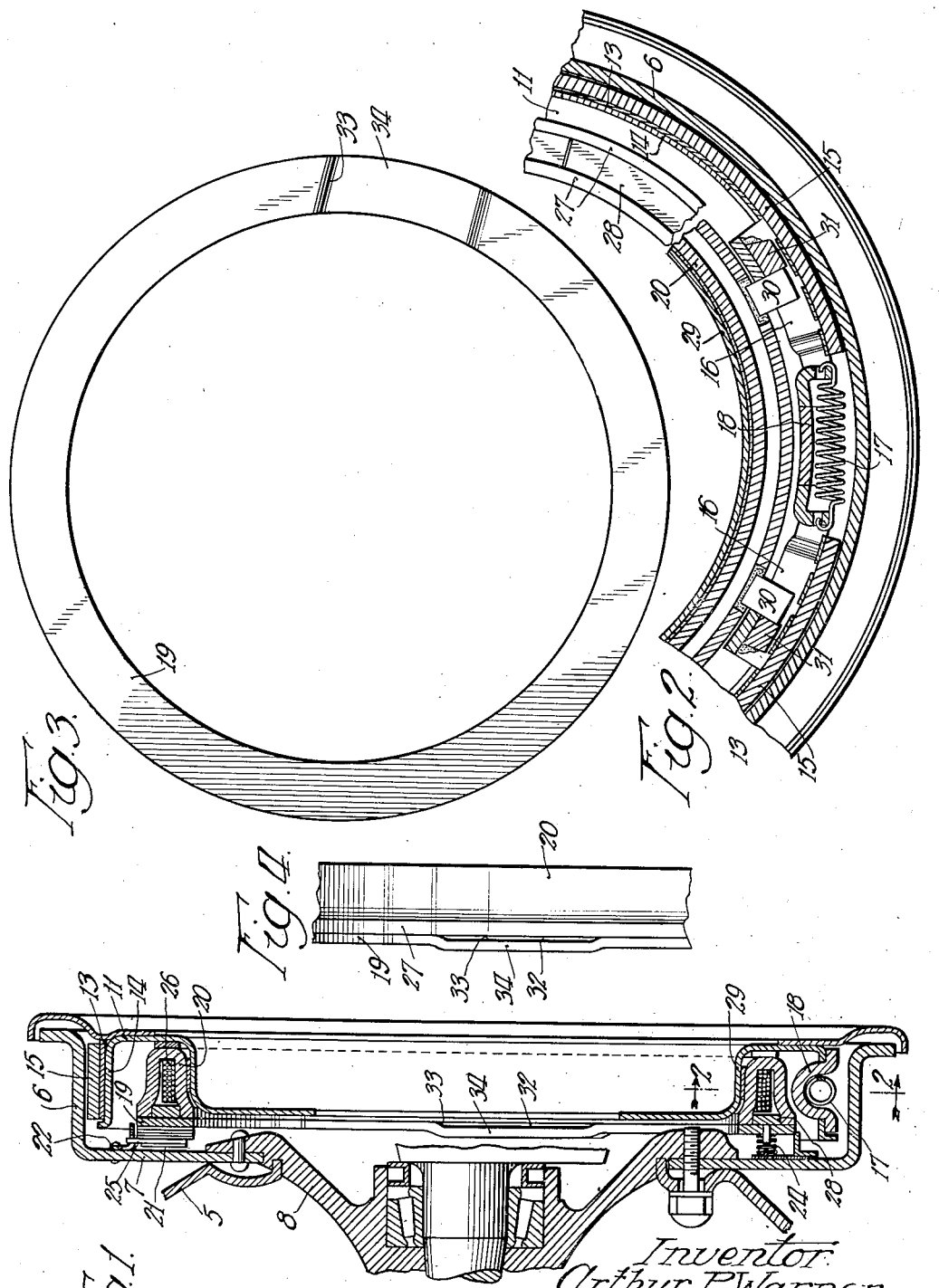

1,981,208

UNITED STATES PATENT OFFICE

1,981,208

ELECTROMAGNETIC FRICTION DEVICE

Arthur P. Warner, Beloit, Wis., assignor to Warner Electric Brake Corporation, South Beloit, Ill., a corporation of Illinois Application March 3, 1930, Serial No. 432,656

10 Claims. (Cl. 188—140)

This invention relates to electromagnetic friction devices and more particularly to those having annular magnetic elements arranged for relative rotation.

The primary object of the invention is to provide a novel means for effectually dissipating the residual magnetism which persists in magnetic structures of the above character and produces objectionable gripping engagement between their coacting faces after the energizing current has been interrupted.

In carrying out this object, I provide a body of non-magnetic medium which is presented momentarily to successive sections of the magnet pole face automatically as an incident to relative rotation between the magnet and its armature and which provides an opening of such magnitude that the residual magnetic flux in each section of the magnet with which the body is associated will be dissipated.

The invention also resides in the novel character and location of the non-magnetic body above referred to.

Other objects and advantages of the invention will become apparent from the following detailed description taken in connection with the accompanying drawing, in which Figure 1 is a diametrical sectional view of an electric brake having an electromagnetic friction device embodying the features of the present invention.

Fig. 2 is a fragmentary sectional view taken substantially along the line 2—2 of Fig. 1.

Fig. 3 is a face view of the armature of the friction device.

Fig. 4 is a fragmentary elevational view of a portion of the magnet and its armature.

While the invention is susceptible of various modifications and alternative constructions, I have shown in the drawing and will herein describe in detail the preferred embodiment, but it is to be understood that I do not thereby intend to limit the invention to the specific form disclosed but aim to cover all modifications and alternative constructions falling within the spirit and scope of the invention as expressed in the appended claims.

In this exemplary form, the invention is embodied in an electric brake for a vehicle wheel 5 including a rotatable drum 6 having the usual flange 7 bolted or otherwise secured to the inner end of the wheel hub 8. The inwardly opening end of the drum is closed by an annular plate 11 suitably secured to a non-rotatable support (not shown).

In the present instance, the non-rotatable friction surface of the brake is of the band type comprising a metal strip 13 encircling an inwardly projecting flange 14 on the anchor plate and carrying segments 15 of friction material. Fittings 16 are secured to the opposite ends of the strip 13 and drawn by a spring 17 into abutting engagement with the opposite end surfaces of a stop 18 rigid with the anchor plate.

The electromagnetic operator in which the present invention is embodied is utilized to spread the ends of the band apart and thereby set the brake. It comprises two rings 19 and 20 of magnetic material arranged concentric with the drum and adapted for axial gripping engagement. Preferably, the ring 19, which constitutes the magnetic armature, is substantially flat and of solid metal construction, being floatingly supported from the drum so as to rotate therewith and at the same time adapted for some degree of axial movement. To this end, the back of the ring is secured at annularly spaced points to the ends of flexible metal strips 21 which extend in a substantially tangential direction and are rigid at their other ends with a ring 22 in turn riveted to the drum flange 7.

When the wheel and drum with the armature unit mounted thereon as above described are placed on the axle, the inwardly facing friction face of the armature is urged away from the drum flange 7 and pressed lightly against the face of the magnet ring 20 by springs 24 acting in compression between the rings 19 and 22. The strips 21, it will be observed, act in tension to prevent relative rotation between the rings 19 and 22 in one direction. Relative rotation in the other direction is prevented by engagement between the ring 22 and arms 25.

The ring 20 constitutes a magnetic core and is U-shaped in cross section with a winding 26 disposed between and enclosed by its two concentric poles 27 and adapted to be energized from a storage battery or other source of electrical power. Plates 28 of non-magnetic material are mounted between the poles and provide a wear resisting surface substantially flush with the end faces of the poles and adapted to sustain the axial pressure between the two magnetic rings. The magnet ring is supported by a circular flange portion 29 of the anchor plate for oscillation about the drum axis.

Projecting rigidly from the outer magnet pole are two actuating lugs 30 having oppositely facing surfaces positioned to abut against lugs 31 which are rigid with the fittings 16 on the brake band. Upon movement of the magnet in either direction away from normal brake-released position (Fig. 2), one or the other of the lugs 30 will move its end of the brake away from the stop 18, thereby expanding the band and pressing its entire friction surface against the drum.

Such actuation of the band takes place whenever the winding 26 is energized with the wheel in motion. This produces a magnetic flux of high intensity in the closed magnetic circuit which encircles the winding through the opposite sections of the magnet core and armature. The resulting magnetic attraction causes gripping engagement between the friction surfaces of the two rings proportional to the strength of the energizing current, whereupon the magnet ring will be driven frictionally by the armature ring thereby moving with the wheel a short angular distance. In this circumferential movement, one end of the band is moved away from the stop 18 which expands the band thereby pressing the segments 15 against the drum surface. After the normal clearance has been taken up, angular movement of the magnet ceases causing slippage between the ring surfaces in the continued rotation of the wheel. When the current flow is interrupted, the spring 17 acting through the medium of the fitting 16 and the lug 30 serves to restore the magnet as well as the actuated end of the band to normal brake-released position.

Inasmuch as the friction faces of the rings 19 and 20 are always maintained in light mechanical contact by the springs 24 while the winding 26 is deenergized, it is unnecessary for the magnetic flux produced by the initial energization of the winding to overcome an air gap between the rings. As a result, the attractive force and, therefore, the degree of braking action is always directly proportional to the strength of the energizing current.

A magnet of the character above described is capable of producing an extremely powerful attractive force when energized by a relatively low current owing to the extremely low reluctance of the magnetic flux circuit which encircles each circumferential section of the winding 26. For this reason and the further reason that the magnetic elements are allowed to remain in mechanical contact after the energizing current is interrupted, the residual magnetic field which inherently exists in the magnetic core following such current interruption, continues to maintain the friction elements under some degree of gripping pressure. Such a persistent drag, if allowed to exist, would be particularly detrimental in a brake of the above character not only because of the light retarding action which it exerts on the wheel but because it subjects the magnetic elements to constant frictional wear and unnecessary heating.

The present invention contemplates the elimination of the detrimental effects of the residual magnetism without materially increasing the reluctance of the magnetic circuit through the elements. This result is attained by a means which acts automatically as an incident to relative motion between the magnetic elements to momentarily interrupt the magnetic circuit at successive points around the elements. This means comprises generally a non-magnetic medium interrupting the continuity of the armature surface opposite one or both of the pole faces for a substantial circumferential length so as to be presented to the successive sections of the magnet face during each revolution of the rotatable magnetic element.

For the sake of simplicity of structure, air is employed herein as the non-magnetic medium and the body 32 thereof which is exposed to the magnet face is defined by a radially extending groove or depression 33 formed in the friction face of the armature ring and preferably extending transversely across the entire face of the magnet. In order to retain the rugged character of the armature ring, the groove is formed without interrupting the continuity of the ring as by depressing a segmental section 34 of the ring away from its friction face.

The face of the armature thus constructed presents to the face of the magnet a flat magnetic section occupying substantially the entire ring circumference and a relatively shorter non-magnetic segment which travels around and is presented momentarily to successive segmental sections of the pole faces in each revolution of the armature ring. Inasmuch as the non-magnetic section of the armature face is exposed to both poles of the magnet, the magnet circuit through any section of the magnet core opposite the air gap is effectually broken even though the groove defining the magnetic medium is relatively shallow.

The action of the revolving air gap in dissipating the residual magnetic field may be best understood by considering the magnet core as being composed of a multiplicity of short segments arranged side by side to form the complete annulus. Obviously, the presentment of the air gap 32 momentarily to any one of these segments will cause the residual flux in such segment to be dissipated because the density of such flux is not sufficient to overcome the high reluctance which the gap interposes in the magnetic circuit through the segment. In a similar way, the residual flux in each segment is destroyed as the gap is presented thereto in travelling around the annular face defined by all of the segments. Thus the total residual field and therefore the attractive force produced thereby will decrease gradually in the first revolution of relative rotation between the magnet and the armature following deenergization of the winding 26. The magnet will become completely demagnetized in the present instance at the completion of the revolution of the vehicle wheel inasmuch as the face of the armature ring carries only one air gap 32.

The effectiveness of a non-magnetic body operating as above described is determined not only by its non-magnetic property and the structural characteristics of the magnet but by its magnitude, particularly its length measured along a circumference of the magnet ring. For example, with an air gap of very short circumferential length, the residual flux in the magnet section exposed to such a gap at any given time would stray through the armature by leaking diagonally across the edge portions of the gap which are of lower reluctance. Thus the magnetic circuit through the exposed section of the magnet would not be broken and the residual magnetism therein not destroyed. Therefore, the circumferential length of the gap should be increased to a point where the residual flux in the central portion of the exposed area of the magnet cannot stray to either edge portion of the armature which defines the gap. On the other hand, it is desirable to reduce the circumferential length of the non-magnetic gap as much as possible in order to minimize the reduction in the effective pole area which the use of such a gap involves. For the same reason, it is preferable to employ but one groove which, of course, necessitates a complete revolution of the armature in order to completely dissipate the residual field.

Another factor to be considered in arriving at the proper circumferential length of the non-magnetic gap is the speed of relative rotation between the friction elements. The rate of relative motion between the elements determines the time during which any given pole area is exposed to the non-magnetic medium. Therefore, owing to the inherent time lag involved in the complete dissipation of a magnetic flux, it will be apparent that a gap of a length sufficient to dissipate the residual flux when the coacting elements are rotating at a very low speed might not effectually eliminate the field when the rotation is at a comparatively higher speed. Therefore, the length of the gap should be increased to a point where the residual flux will disappear under the speed of relative rotation to be encountered in the service to which the device is put.

In view of the many influential factors involved, the determination of the most advantageous length of the non-magnetic armature section for any magnet structure will be a matter of experimentation. The results of experiments with magnetic friction devices of the character and in the environment above described show that the residual field produced upon deenergization of the winding 26 can be effectually dissipated when the circumferential length of the non-magnetic medium is approximately twice the radial width of the magnet face.

The thickness of the air gap as measured in an axial direction need be considered only when the entire gap is defined by a magnetic medium as is done in the present case. Thus the groove 33 should be of a depth such as to prevent the residual flux from leaking directly across the gap to the segment 34 of the armature ring.

The radial width of the non-magnetic medium is not an important factor to be considered in the present instance because the groove 33 extends radially across the entire face of the armature. In case only one pole of the magnet is exposed to the gap or both poles exposed without interrupting the continuity of the armature surface opposite the wear plates 28, the gap should be wider than the exposed pole face or faces by an amount sufficient to prevent leakage of the residual flux in a radial direction to the adjacent portion of the armature.

Also, the annular poles of the magnet might be spaced so close to each other that the intervening gap would not prevent leakage of the residual flux directly from one pole to the other, thereby destroying the effectiveness of the armature gap in dissipating the residual field. This condition is not encountered in the present instance owing to the substantial radial width of the non-magnetic wear plates 28 which separate the poles 27.

From the foregoing it will be apparent that an effective means has been provided for eliminating the detrimental action of residual magnetism in an electromagnetic friction device of the class described. This result is attained without increasing the reluctance of the magnetic circuit through the magnet core sections and the armature and with only a relatively small decrease in the total attractive force which the magnet would otherwise be capable of producing. By utilizing air as the non-magnetic medium and preserving the continuity of the armature ring, the magnetic structure is not materially complicated nor its strength reduced. The residual flux eliminating means is particularly adapted for use in the environment above described where the magnetic circuit through the coacting friction elements is intentionally maintained closed after the energizing current has been interrupted. Inasmuch as complete dissipation of the residual magnetism is effected by a non-magnetic body carried by only one of the magnetic rings and the iron surface of the other ring is therefore uninterrupted, the total reluctance of the magnetic circuit through the two rings remains at a constant value for all angular positions of the rings during their relative rotation.

I claim as my invention

1. An electromagnetic friction device combining a ring of magnetic material having two radially spaced poles with flat magnetic faces, a second ring of magnetic material having a flat face bridging said pole faces, a winding enclosed by said poles and adapted when energized to bring the coacting friction faces of said rings into gripping engagement, said rings being arranged for relative rotational movement, and means operating as an incident to relative rotational movement between said rings to dissipate the residual magnetic field which threads the magnetic circuit through said rings upon deenergization of said winding comprising a groove formed in and extending radially across the entire face of said second ring so as to define an air gap opposite both of said pole faces, the edges of said groove being spaced circumferentially a substantial distance so as to allow dissipation of the residual flux in each section of said magnet ring with which said air gap becomes associated in the relative motion between the rings.

2. An electromagnetic friction device combining a magnet ring having a flat annular friction face with two concentric pole faces substantially flush therewith, a flat ring of magnetic material constituting an armature for said magnet and having a friction face adapted to be brought into gripping engagement with the face of said magnet upon energization of the latter, said rings being arranged for relative rotation, and an air gap interrupting the continuity of the armature face and defined by a radially extending groove formed by depressing a segment of said armature ring, said air gap being presented to successive sections of the magnet face as an incident to relative rotation between the rings.

3. An electromagnetic friction device combining an annular magnet having two continuous pole faces, an armature for said magnet having a face coacting with and overlapping said pole faces and adapted to be brought into frictional gripping engagement with the face of said magnet upon energization of the latter, and a body of air interrupting the continuity of said armature face opposite a segmental portion of one of said pole faces, said body being presented to successive sections of the pole face as an incident to relative rotation between said rings whereby to open the magnetic circuits through such sections and thereby dissipate the residual magnetism therein.

4. An electromagnetic friction device combining a ring of magnetic material having two spaced poles with annular faces, a winding carried by said ring and adapted when energized to create a magnetic flux through said faces, a second ring presenting a face to said pole faces having two segmental sections one of which is composed of magnetic material and coacts with substantially the entire area of said pole faces, the other section being composed of a non-magnetic medium and acting in the relative rotation between said rings following deenergization of said winding to interrupt the magnet circuit through each circumferential section of said first ring whereby to dissipate the residual magnetic flux threading such sections.

5. An electromagnetic friction device combining an annular magnet having a pole face and an annular armature adapted to be brought into gripping engagement with the face of said magnet upon energization of the latter, there being a non-magnetic body exposed to the magnet face over a substantial circumferential length thereof and adapted to be wiped around the entire face of the magnet as an incident to one revolution of relative rotational movement between said magnet and said armature whereby to interrupt the magnetic flux circuit through successive sections of said magnet and thereby dissipate the residual magnetic flux which threads such circuits upon interruption of the energizing current in said magnet.

6. An electromagnetic friction device combining a magnet ring providing two spaced poles with continuous circular iron faces, and an annular winding disposed between said poles, a second ring of magnetic material adapted to be brought into frictional gripping engagement with said first ring and overlying said poles, there being a single body of non-magnetic medium interrupting the continuity of the surface of said second ring opposite at least one of said poles providing, in the magnetic circuit through the section of the magnet ring with which it is associated at any time, a reluctance of sufficient width and circumferential length to effect dissipation of the residual magnetic field during relative rotation between the rings through one complete revolution.

7. An electromagnetic friction device combining a pair of annular magnetic elements arranged for relative rotation and adapted to be brought into frictional gripping engagement by energization of a winding carried by one of the elements, and a body of non-magnetic medium interrupting the iron surface of the other element and acting as an incident to a single complete revolution of relative rotation between the elements to effect complete dissipation of the residual magnetism persisting in the rings following deenergization of the winding.

8. An electromagnetic friction device combining an annular magnetic winding and a pair of magnetic rings enclosing said winding and arranged for relative rotational movement by slippage at their engaging friction faces, the reluctance of the magnetic circuit through said rings being constant for all angular positions of the rings relative to each other, and a body of non-magnetic medium movable with one of said rings interrupting a segmental portion of the magnetic circuit therethrough and being of such dimensions as to dissipate the residual magnetism in the successive sections of the magnetic ring in which said body is disposed during relative rotation between the rings.

9. An electromagnetic friction device combining a ring of magnetic material having an annular face, a second ring adapted for frictional gripping engagement with said first mentioned ring and for rotation relative thereto, and an electromagnetic winding adapted when energized to bring the surfaces of said rings into gripping engagement, said rings enclosing said winding and providing around the same a ferro-magnetic circuit the reluctance of which remains substantially constant during relative rotation between the rings when said winding is energized, there being a non-magnetic body interrupting a segmental section of said magnetic circuit and acting during relative motion between the rings after deenergization of said winding to effect dissipation of the residual magnetism in the successive sections of the circuit into which said body becomes disposed.

10. An electromagnetic friction device combining a ring of magnetic material having two spaced poles with uninterrupted iron faces, an annular winding carried by said ring between said poles, a second ring of magnetic material adapted to be brought into frictional gripping engagement with said first ring and overlying said poles so as to form a magnetic flux circuit encircling all sections of said winding, a body of non-magnetic medium rotatable with said second ring and interrupting a portion of its gripping face opposite one of said pole faces so as to provide an opening in said magnetic circuit through the rings of sufficient magnitude to allow complete dissipation of the residual magnetic field upon relative rotation between said rings following deenergization of said winding.

ARTHUR P. WARNER.